United States Patent [19]

Kobiella

[11] Patent Number: 4,483,438

[45] Date of Patent: Nov. 20, 1984

[54] FILM STRAP WELD

[75] Inventor: Robert J. Kobiella, Rolling Meadows, Ill.

[73] Assignee: Signode Corporation, Glenview, Ill.

[21] Appl. No.: 442,523

[22] Filed: Nov. 19, 1982

[51] Int. Cl.³ .................... B65D 63/10; B65D 19/38; B65B 13/02; B32B 7/14

[52] U.S. Cl. .................................. 206/83.5; 206/597; 100/33 PB; 100/4; 156/157

[58] Field of Search .............................. 206/83.5, 597; 100/33 PB, 3, 4; 156/157

[56] References Cited

U.S. PATENT DOCUMENTS

| | | |
|---|---|---|
| 1,440,690 | 1/1923 | McMosiman . |
| 1,575,524 | 3/1926 | Benjamin et al. . |
| 1,599,652 | 9/1926 | Cranston . |
| 1,619,782 | 3/1927 | Archila . |
| 1,631,371 | 6/1927 | Greubel . |
| 1,720,170 | 7/1929 | Davies . |
| 2,206,848 | 7/1940 | McAvoy . |
| 2,220,407 | 11/1940 | Joss . |
| 2,339,876 | 1/1944 | Phillips . |
| 2,638,963 | 5/1953 | Frederick et al. . |
| 3,075,862 | 1/1963 | Hoyer . |
| 3,269,300 | 8/1966 | Billet et al. .............. 100/3 |
| 3,418,196 | 12/1968 | Luc . |
| 3,442,732 | 5/1969 | Stensaker et al. .......... 100/33 PB |
| 3,586,590 | 6/1971 | Brenneisen .................. 156/580 |
| 3,629,035 | 12/1971 | Kuroda ...................... 156/219 |
| 3,749,622 | 7/1973 | Sato et al. .................. 156/157 |
| 3,759,414 | 9/1973 | Beard . |
| 3,797,694 | 3/1974 | See et al. . |
| 3,996,403 | 12/1976 | Gould et al. ............... 100/33 PB |
| 4,062,278 | 12/1977 | Cheung ...................... 100/33 PB |

FOREIGN PATENT DOCUMENTS 742723  1/1956  United Kingdom .

Primary Examiner—William T. Dixson, Jr.
Attorney, Agent, or Firm—Dressler, Goldsmith, Shore, Sutker & Milnamow, Ltd.

[57] ABSTRACT

A joint is provided in first and second overlapping portions of a loop of thermoplastic thin film wide strap tensioned about an article. The joint comprises a plurality of fused regions at the interface of the overlapping portions. The fused regions are spaced apart across the width of the strap. Each fused region has the form of an interface layer of merged resolidified strap surface portions.

8 Claims, 6 Drawing Figures

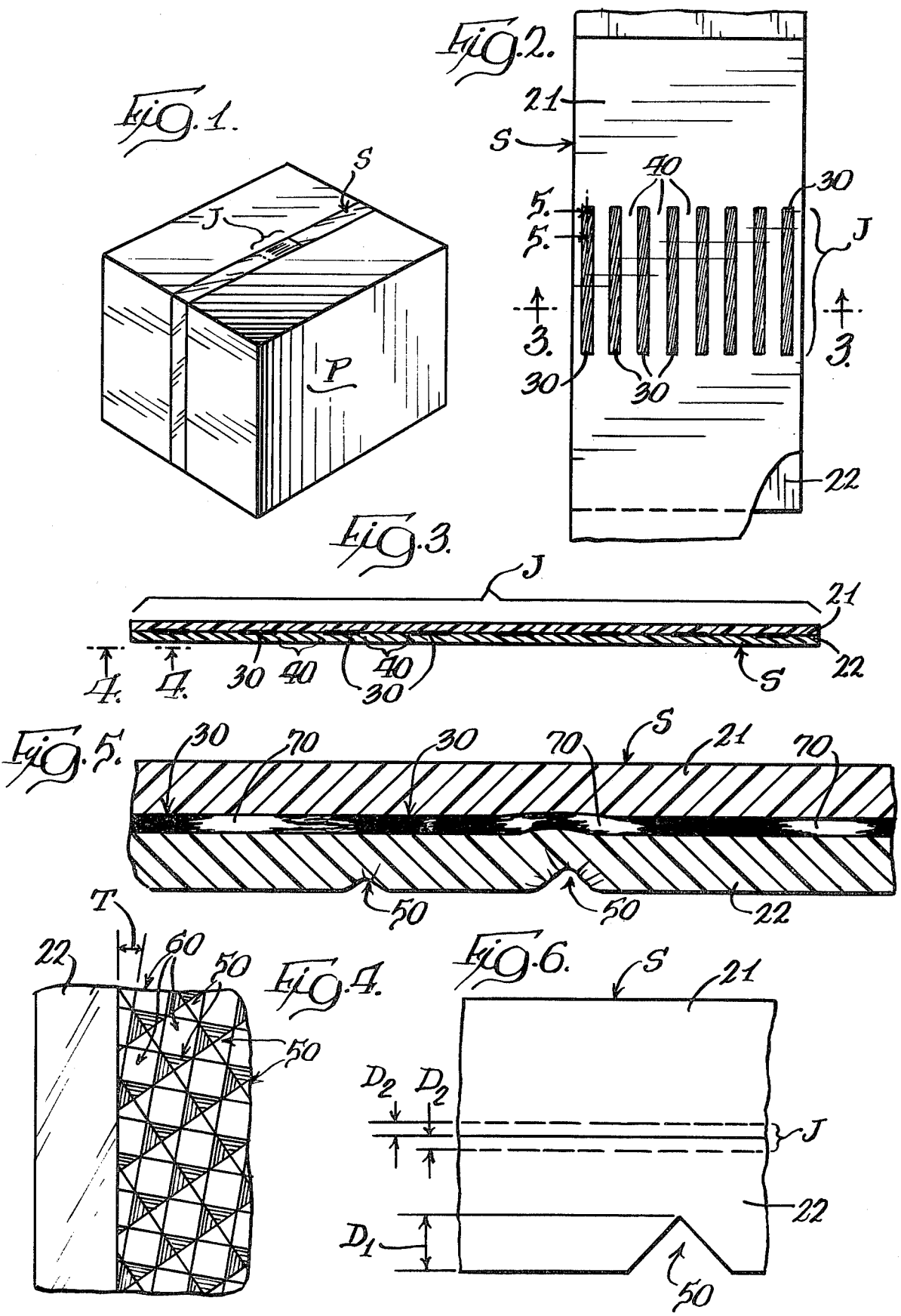

FILM STRAP WELD

CROSS-REFERENCE TO RELATED APPLICATION

This application is related to the concurrently filed U.S. patent application Ser. No. 443,212 of Robert Kobiella entitled, "Article Strapping Method And Apparatus, Chain Assembly For Such Apparatus And For Other Apparatus, And Method For Making Such Chain Assembly."

TECHNICAL FIELD

The invention disclosed herein relates to a joint for securing together overlapping portions of thermoplastic strap.

BACKGROUND OF THE INVENTION AND TECHNICAL PROBLEMS REQUIRING SOLUTION

Methods and apparatus are known for securing together, with a fused or welded joint, overlapping portions of a tensioned loop of thermoplastic strap encircling an article. One approach is to apply a heated member to the overlapping strap portions to effect a melting of at least the facing strap surfaces after which the strap portions are held together while the melted material resolidifies to form a welded joint. A related method effects the melting at the strap surfaces with ultrasonic energy.

Another, and very effective, process forms a welded joint by first compressing the overlapping strap portions together and then creating unidirectional or multidirectional bodily sliding frictional movement between the contacting strap surface regions to melt interface regions of the overlapping strap portions. The melted interface regions are allowed to solidify so as to bond the overlapping strap portions together in a weld or joint.

This frictional process, which can be generally described by the term friction-fusion welding, has proven to be especially effective with conventional thermoplastic strap materials such as nylon, polyester, polypropylene, and,the like. Such conventional strap is typically provided in widths ranging from 5 mm. to 9.525 mm. and in thicknesses ranging between about 0.254 mm. and about 0.889 mm.

With conventional thermoplastic strap having a thickness of between about 0.254 mm. and about 0.889 mm., the overlapping strap portions are typically bonded together in a friction-fusion weld to a thickness of between about 0.013 mm. and 0.051 mm. in each overlapping strap portion across the entire width of the strap. Typically, the length of the friction-fusion bond extends for about 10 mm. to about 35 mm. along the length of the overlapping strap portions.

Although conventional strap works well in a great many applications, the inventor of the present invention has determined that it would be highly desirable to provide, in some applications, strap that is considerably wider than conventional strap (e.g., two to eight times as wide) and that is considerably thinner (e.g., 0.08 mm.).

Such thin film wide strap may also be transparent and could advantageously be used in certain applications, including in the binding of a stack of newspapers or magazines. The relatively wide strap would reduce the pressure on the stack of newspapers or magazines, particularly at the corners, and would thereby have less of a tendency to damage the newspapers or magazines. Finally, a relatively thin, transparent, strap readily permits viewing of the portion of the article which is covered by the strap.

The inventor of the present invention has determined that welded strap joints having a conventional configuration are difficult to employ satisfactorily with thin film wide strap. For one thing, much more energy would be required to melt the entire surface areas of the overlapping wide strap portions in the selected joint region. Further, control of the thickness of the fused material in the thin strap would be difficult. Also, care must be taken to avoid unwanted penetration of one or both of the overlapping strap portions. In addition, methods for melting the full strap width surface portions with heated members would require that the overlapping strap portions be subsequently held together for commercially unacceptable long periods of time as the strap joint cools.

Even more problems are encountered with thin film strap fabricated from so-called "oriented" materials, such as, for example, strap comprising linear crystallizable polypropylene that has been worked into a thin film having planar molecular orientation of the macromolecular chains with a uniplanar, axial oriented crystalline structure through at least a major portion of the film thickness. An attempt to produce a conventional weld in such film strap across the full width of the strap may result in reduced weld strength and can reduce the strap strength at the weld since the strap orientation is destroyed in the fused region of the weld.

The inventor has determined that it would be desirable to provide a fused joint or weld in overlapping portions of such thin film wide strap wherein the overlapping strap portions retain a sufficient amount of tensile strength after formation of the joint to enable the strap to properly function in a tensioned loop around an article at conventional strapping tensions for the applications in which such thin film strap would be used. Such an improved joint should desirably accommodate various means for effecting its formation at commercially acceptable speeds. Preferably, such an improved joint should accommodate its rapid formation by friction-fusion techniques.

SUMMARY OF THE INVENTION

A joint is provided in first and second overlapping portions of a loop of thermoplastic thin film strap tensioned about an article. The joint comprises a plurality of fused regions at the interface of the overlapping portions. The fused regions are spaced-apart across the width of the strap. Each fused region has the form of an interface layer of merged resolidified strap surface portions.

The joint is especially effective with wide strap comprising linear crystallizable polypropylene that has been worked into a thin film having planar molecular orientation of the macromolecular chains with a uniplanar, axial oriented crystalline structure through at least a major portion of the film thickness. Preferably, the fused regions are produced by friction-fusion and each fused region has the form of a generally elongate, rectangular prism-shaped interface layer of resolidified strap portions extending into each strap. Each merged resolidified strap portion may contain a plurality of smaller unfused portions, each of the smaller unfused portions having a length and width less than the length and width, respectively, of the merged resolidified strap portion containing the smaller unfused portion.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 is a perspective view of a joint of the present invention that is formed in two overlapping portions of a loop of strap tensioned about an article;

FIG. 2 is an enlarged, fragmentary, plan view of the strap portions in the area of the joint;

FIG. 3 is a greatly enlarged, cross-sectional view taken along the plane 3—3 in FIG. 2;

FIG. 4 is a greatly enlarged, fragmentary view of the surface of one of the strap portions taken generally along the plane 4—4 in FIG. 3;

FIG. 5 is a greatly enlarged, fragmentary, cross-sectional view taken generally along the plane 5—5 in FIG. 2; and FIG. 6 is a greatly enlarged, fragmentary, diagrammatic view of a cross section of the joint similar to that shown in FIG. 5.

DESCRIPTION OF THE PREFERRED EMBODIMENT

While this invention is susceptible of embodiment in many different forms, there are shown in the drawings and will herein be described in detail one preferred embodiment of the invention. It will be understood, however, that the present disclosure is to be considered as an exemplification of the principles of the invention and is not intended to limit the invention to the embodiment illustrated.

An article P is shown in FIG. 1 bound with a loop of tensioned strap S having first and second overlapping portions secured together at a joint J. In FIG. 2 the joint J is seen to connect the strap upper, or first, overlapping portion 21 to a lower, or second, overlapping portion 22.

As best illustrated in FIGS. 2 and 3, the joint J includes a plurality of fused regions 30 at the interface of the overlapping strap portions 21 and 22. The fused regions 30 are spaced apart across the width of the strap S. Each fused region 30 has the form of an interface layer of merged resolidified strap surface portions.

Preferably, as best illustrated in FIGS. 2 and 3, each fused region 30 is elgonate and has the form of a generally rectangular prism-shaped interface layer extending from the interface for some fraction of the thickness of each strap portion. A plurality of elongate unfused regions 40 separate the fused regions 30 across the width of the strap S.

The joint J is especially effective with oriented thin film wide strap, such as wide strap having a thickness of, for example, 0.13 mm. or less and comprising linear crystallizable polypropylene that has been worked into a thin film having planar molecular orientation of the macromolecular chains with a uniplanar, axial oriented crystalline structure through at least a major portion of the film thickness.

The inventor of the present invention has determined that the above-described joint configuration with spaced-apart fused regions 30 results in acceptable strength welds of the oriented thin film strap without sacrificing an unacceptable amount of strap strength at the weld. Since the overlapping strap portions 21 and 22 are not welded or fused in the spaces between the fused regions 30, the overlapping strap portions retain substantially all of their original strength in the unfused regions 40. Further, since the fused regions 30 run parallel to the length of the strap S, the tension stress in the strap S can be taken without interruption along the entire length of the joint J in the adjacent non-welded (unfused) regions 40 of the strap S.

The joint configuration illustrated in FIGS. 2 and 3 is especially effective with 0.08 mm. thick oriented polypropylene strap having a width of about 50 mm. For such strap, the width and length of each fused region 30 may be about 2.5 mm. and about 28 mm., respectively. Preferably, the fused portions 30 are uniformly spaced apart by a distance of about 4 mm. on 50 mm. wide strap to give a total fused width of about 40 percent of the strap width. A smaller total fused area of about 30 percent of the strap has also been found to be acceptable. The fused thickness in each of the overlapping thin film strap portions 21 or 22 at the joint J appears to range between about 0.013 mm. and about 0.025 mm. for oriented thin film wide strap that has been welded with such a joint configuration.

The inventor of the present invention has determined that this novel joint configuration works well on thin film straps of various widths. The configuration illustrated in FIG. 2, and described above with reference to a 50 mm. wide film strap, employs eight spaced-apart regions 30. For narrower thin film strap, less than eight fused regions 30 may be employed. For wider film strap, more than eight fused regions 30 may be employed.

The joint J illustrated in FIG. 2 has a fused region 30 relatively close to each side margin of the strap S. A greater or lesser width of unfused material may be provided between the outermost fused regions 30 and the strap edge if desired. However, the location of the outermost fused regions 30 as close as possible to the edge of the strap S eliminates loose strap material that might be grasped or accidentally snagged in any manner tending to apply unwanted stress the to joint J.

The above-described joint J is easily formed by novel friction-fusion techniques. Specific methods and apparatus for forming the joint J are described in detail in the concurrently filed U.S. patent application of Robert Kobiella entitled, "Article Strapping Method And Apparatus, Chain Assembly For Such Apparatus And For Other Apparatus, And Method For Making Such Chain Assembly."

Briefly, friction-fusion techniques can be employed to form the joint J by pressing the overlapping strap portions 21 and 22 against an anvil (not illustrated) with the first portion 21 contacting the anvil and with a weld pad (not illustrated) pressing against and gripping the second portion 22. The weld pad can then be moved to effect bodily sliding frictional movement of the second portion 22 relative to the first portion 21 to cause melting at the interface which subsequently resolidifies. Preferably, the weld pad has a plurality of raised, elongate ribs corresponding to the ultimately formed fused regions 30. Preferably, each rib has a height of about 0.35 mm. or more.

Each weld pad rib also preferably has a plurality of pyramid-shaped teeth. In one form of the weld pad, the teeth have a height of about 0.2 mm. and a base length of about 0.4 mm. These teeth are pressed into the outer surface of the second overlapping strap portion 22 to a depth $D_1$ (FIG. 6) of about 0.075 mm. during the friction-fusion welding process. The bottom surface of the second overlapping portion 22 is thus deformed and imprinted with indentations 50 generally corresponding to the pyramid shape of the ends of the teeth as illustrated in FIG. 4.

The indentations 50 correspond to an array of teeth which are arranged in a rank and file, checkerboard-like pattern on each rib of the weld pad. A pair of opposite sides of the base of each tooth are aligned parallel to the ranks and the other pair of opposite sides of the base of each tooth are aligned parallel to the files. The teeth in each rank and file are uniformly spaced apart by an amount equal to the base of each tooth. The teeth in each rank and file are staggered relative to the teeth in the adjacent ranks and files, respectively. Each tooth in each rank and file is disposed directly adjacent a space (corresponding to an unindented region 60 on the strap surface) between two teeth in the adjacent rank and file, respectively.

When designing apparatus for the friction-fusion welding of thermoplastic strap with any type of strap engaging weld pad, care must be taken to ensure that the strap will not be unacceptably damaged by the contacting surface of the weld pad. The inventor of the present invention has determined that unacceptable damage can occur to some types and thicknesses of strap when weld pads are forced against the strap at certain force levels and reciprocated within certain frequency ranges. Such damage has manifested itself as penetration through the overlapping strap portion that is in contact with the weld pad.

Such damaged strap portions appear to have been "milled" by the weld pad and such milling action can remove much of the strap material—at least at certain points in the weld area. This "milling" problem, and its significance, is dependent on, among other things, (1) the surface structure of the weld pad, (2) the welding compression forces, (3) the reciprocation frequency, (4) the strap material, and (5) the thickness of the strap.

The inventor has determined that the tendency of a weld pad to mill through the thin film strap is greatly reduced, if not eliminated all together, by skewing the ranks or rows of teeth on the weld pad ribs at an angle relative to length of the ribs. This angle is designated as angle T in FIG. 4. An angle T of ten degrees has been found to be especially effective in reducing the milling tendency of the weld pad, ceteris paribus, with thin film strap.

A few of the indentations 50 in the bottom of the lower overlapping strap portion 22 are visible in FIG. 5. The indentations are not all of the same depth as viewed along the cross section of FIG. 5 since the toothed pattern is skewed at an angle of ten degrees as illustrated in FIG. 4 and, therefore, the section plane 5—5 taken in FIG. 2 cuts through different cross sections of the tooth indentations 50.

When the joint J is formed in the overlapping strap portions with a weld pad having the above-described toothed rib configuration, it is possible to produce a joint J in which the fused regions 30 defined by the merged resolidified strap portions contain a plurality of smaller, unfused portions 70 as best illustrated in FIG. 5. Each of the smaller, unfused portions 70 has a length and width dimension less than the length and width dimension, respectively, of the merged resolidified strap portion in the region 30 containing the smaller, unfused portion 70. The smaller, unfused portions 70, which may contribute to joint strength, are believed to result from the compressive forces on the overlapping strap portions acting through the unique tooth pattern on the weld member.

The above-described joint J, when formed by friction-fusion welding methods in 0.08 mm. thick oriented polypropylene strap, has been found to have a strength of at least about 75 percent of the strap strength. The fused regions 30 in such a joint J extend from the interface of the overlapping strap portions to a depth $D_2$ (FIG. 6) in each overlapping strap portion of less than about 0.04 mm. and appear to typically range between about 16 percent and about 31 percent of the strap thickness.

Preferably, the joint J is formed in the 0.08 mm. thick oriented polypropylene strap by friction-fusion at a frequency of at least about 200 Hertz for a period of at least about 17 milliseconds. A continuously damped relative movement between the overlapping strap portions, with an initial amplitude of about 9 mm., has been found to produce a good joint with the strap. Further, the joint J is preferably produced by maintaining compression on the overlapping strap portions for an additional period of about 20 milliseconds following the termination of the bodily sliding movement to allow the joint J to cool and to allow the fused regions 30 to solidify under the compression load.

From the foregoing it will be observed that numerous variations and modifications may be effected without departing from the true spirit and acope of the novel concept of the invention. It is, of course, intended to cover by the appended claims all such modifications as fall within the scope of the claims.

What is claimed is:

1. A joint in first and second overlapping portions of a loop of wide film strap tensioned about an article, said strap comprising linear crystallizable polypropylene that has been worked into a wide thin film having planar molecular orientation of the macromolecular chains with a uniplanar, axial oriented crystalline structure through at least a major portion of the film thickness, said joint comprising:

a plurality of elongate fused regions at the interface of said overlapping portions uniformly spaced across the width of the strap;

a plurality of elongate unfused regions separating said elongate fused regions across the width of the strap, the sum of the widths of said elongate fused regions being between about 30 and about 40 percent of the width of said strap;

each said elongate fused region having the form of a generally rectangular prism-shaped interface layer of merged resolidified strap portions extending into each strap to a depth of between about 16 percent and about 31 percent of the strap thickness; and each said merged resolidified strap portion containing a plurality of smaller unfused portions, each said smaller unfused portion having length and width dimensions less than the length and width dimensions, respectively, of the merged resolidified strap portion containing the smaller unfused portion.

2. The joint in accordance with claim 1 in which said joint is produced by compressing said overlapping strap portions between an anvil with the first overlapping strap portion contacting the anvil and with a weld pad pressing against and gripping the second overlapping strap portion wherein (1) said weld pad has a plurality of raised, elongate ribs with a plurality of pyramid shaped teeth each having a height of about 0.2 mm. and a base length of about 0.4 mm., said teeth being arranged in parallel rows skewed at an angle of about 10 degrees relative to longitudinal axes of said ribs, (2) said weld pad is pressed against said second overlapping strap portion to urge the rib teeth into a surface of the second overlapping strap portion to a depth of about 0.075 mm., and (3) said weld pad is moved to effect bodily sliding frictional movement of said second overlapping strap portion parallel to and against said first overlapping strap portion to cause melting of the strap at said interface which subsequently resolidifies.

3. A joint in first and second overlapping portions of a thermoplastic thin film strap tensioned about an article, said joint comprising a plurality of elongate fused regions at the interface of said two overlapping strap portions and a plurality of elongate unfused regions separating said fused regions, said fused regions extending from the interface of the overlapping strap portions to a depth in each overlapping strap portion of less than about 0.04 mm., said fused regions and said unfused regions being oriented lengthwise in a direction generally parallel to the strap length, said overlapping strap portions being substantially free of fused regions extending transversely of the strap length between fused regions at said joint.

4. The joint in accordance with claim 3 in which fused regions are produced by continuously damped, bodily sliding frictional relative movement between the overlapping strap portions for at least about 17 milliseconds with an initial amplitude of about 9 mm. and a frequency of at least about 200 Hertz.

5. The joint in accordance with claim 4 in which said joint is produced by compressing said overlapping strap portions together during the bodily sliding movement and for an additional period of about 20 milliseconds following the termination of the bodily sliding movement to allow the joint to cool and to allow said fused regions to solidify under compression.

6. A joint in first and second overlapping portions of a loop of thermoplastic thin film wide strap tensioned about an article, said joint comprising: a plurality of fused regions at the interface of said overlapping portions, said fused regions being spaced apart across the width of the strap, and each said fused region having the form of an interface layer of merged resolidified strap surface portions.

7. A joint in first and second overlapping portions of a loop of thermoplastic thin film wide strap tensioned about an article, said strap having a thickness not exceeding 0.08 mm. and a width of at least 50 mm., said joint comprising:

a plurality of elongate fused regions at the interface of said overlapping portions uniformly spaced apart across the width of the strap with the distance between adjacent regions being about 4 mm.;

a plurality of elongate unfused regions separating said elongate fused regions across the width of the strap, the sum of the widths of said elongate fused regions being between about 30 and about 40 percent of the width of said strap; and each said elongate fused region having the form of a generally rectangular prism-shaped interface layer of merged resolidified strap portions extending into each strap to a depth of at least about 16 percent of the strap thickness.

8. The joint in accordance with claim 7 in which each said fused region has a length of about 28 mm. and a width of about 2.5 mm.

* * * * *